United States Patent

Nowell et al.

[11] Patent Number: 5,325,798
[45] Date of Patent: Jul. 5, 1994

[54] PLANTING SPACER AND PLANTING DEPTH DEFINING DEVICE

[76] Inventors: Brian W. Nowell; Gregory L. Nowell, both of 4303 N. Rogers Rd., Spring Valley, Calif. 91977

[21] Appl. No.: 995,159

[22] Filed: Dec. 22, 1992

[51] Int. Cl.⁵ ............................................. A01C 5/02
[52] U.S. Cl. ........................................ 111/99; 111/92; 33/1 H; 33/809
[58] Field of Search .................. 111/92, 94, 99, 7.1; 33/571, 521, 1 H, 486, 494, 516, 520, 604, 666, 427, 428, 447, 464, 489, 809

[56] References Cited

U.S. PATENT DOCUMENTS

| | | |
|---|---|---|
| 906,581 | 12/1908 | Toreson .................. 33/571 |
| 1,439,601 | 12/1922 | Boop ...................... 111/92 |
| 1,554,062 | 9/1925 | Zelenski ................. 111/99 |
| 1,564,721 | 12/1925 | Tallon . |
| 2,044,871 | 6/1936 | Beasley .................. 111/99 |
| 2,336,393 | 12/1943 | Combes ................. 33/809 |
| 2,714,863 | 8/1955 | Binyon . |
| 2,865,315 | 12/1958 | Goldstein . |
| 3,015,889 | 1/1962 | Godman ................. 33/666 |
| 3,027,856 | 4/1962 | Dannevig . |
| 3,126,847 | 3/1964 | Morris . |
| 4,218,981 | 8/1980 | Kelly . |
| 4,275,672 | 6/1981 | Clad . |
| 4,401,166 | 8/1983 | Brown ................... 33/624 |
| 4,554,746 | 11/1985 | Echeverria ............. 33/447 |
| 4,736,694 | 4/1988 | Kratky . |

FOREIGN PATENT DOCUMENTS

| | | |
|---|---|---|
| 2456307 | 1/1981 | France ..................... 33/1 H |
| 19585 | 1/1904 | United Kingdom ..... 33/836 |
| 133418 | 10/1919 | United Kingdom . |
| 171012 | 11/1921 | United Kingdom ..... 111/99 |
| 759941 | 10/1956 | United Kingdom ..... 111/99 |

Primary Examiner—Randolph A. Reese
Assistant Examiner—Spencer Warnick
Attorney, Agent, or Firm—Terry M. Gernstein

[57] ABSTRACT

A planting spacer and planting depth defining device includes a central rod on which a block is slidably mounted to define the depth of plant-receiving planting holes. A ruler is slidably received in the block and is used to define the spacing between plant-receiving holes. The plant-receiving holes are defined by forcing a point of the rod into the ground at the location marked using the ruler. The block is positioned on the rod element at a location to set the depth of the plant-receiving hole when the rod element point is forced into the soil until the block engages the soil.

6 Claims, 3 Drawing Sheets

PLANTING SPACER AND PLANTING DEPTH DEFINING DEVICE

TECHNICAL FIELD OF THE INVENTION

The present invention relates to the general art of agriculture, and to the particular field of planting devices.

BACKGROUND OF THE INVENTION

Home gardening has always been popular, and in recent times has become even more popular as both a necessity and as a hobby. Gardening generally involves planting a plurality of plants in a row. Each plant has a special depth at which it should be planted and it is best if all plants in a single row are lined up. At one time, for small seed planting, most home gardeners made planting holes with their finger or with a stick, and guessed at the planting depth. Many gardeners plant seeds in a furrow and thin plants to the proper spacing after they have sprouted to overcome the deficiencies of this "eyeball" method of planting.

Accordingly, the agriculture art has included several means for spacing plants. Such means often are not easily adjustable over a wide range in a plurality of planes. Therefore, while such devices are improvements over trial and error or "eyeball" methods of spacing and planting, they are not fully successful, especially with regard to accuracy. Still further, many of these devices are difficult or cumbersome to modify for a particular use.

Therefore, there is a need for a planting device that is easily adjustable over a wide range in a plurality of planes and which will accurately space and measure holes for planting, and which is easy to use and modify for any particular use.

OBJECTS OF THE INVENTION

It is a main object of the present invention to provide a planting spacer that is easy to use.

It is another object of the present invention to provide a planting spacer that is easy to modify for a particular use.

It is another object of the present invention to provide a planting spacer that is easy to modify in a plurality of planes.

It is another object of the present invention to provide a planting spacer that is accurate.

It is a specific object of the present invention to provide a planting spacer that eliminates the need for thinning.

SUMMARY OF THE INVENTION

These, and other, objects are achieved by an adjustable, biaxial locating/measuring soil penetrating seed dibble delineator. As used herein, a "dibble" is a pointed tool for making holes in the ground for seeds, bulbs, or young plants. The device of the present invention includes a round rod with a tapered tip at one end that is held in a vertical orientation with the tip downward for use. The tool further includes a mounting block with a center hole for the rod to pass through. A thumb screw is used to secure the mounting block to the rod at any position on the rod. The mounting block also includes a slot into which a ruler is slidably mounted, and which is oriented horizontally when the rod is oriented vertically in a hole-defining orientation. Both the rod and the ruler have graduations marked thereon which are used to set the depth and spacing of the planting holes to be made by the dibble.

Using the device of the present invention, the depth and spacing of planting holes are easily adjusted for a particular use. The planting depth is easily adjusted by moving the mounting block on the rod, while the spacing is easily adjusted by adjusting the ruler with respect to the rod.

BRIEF DESCRIPTION OF THE DRAWING FIGURES

DETAILED DESCRIPTION OF THE PREFERRED EMBODIMENT OF THE INVENTION

Figure 1:
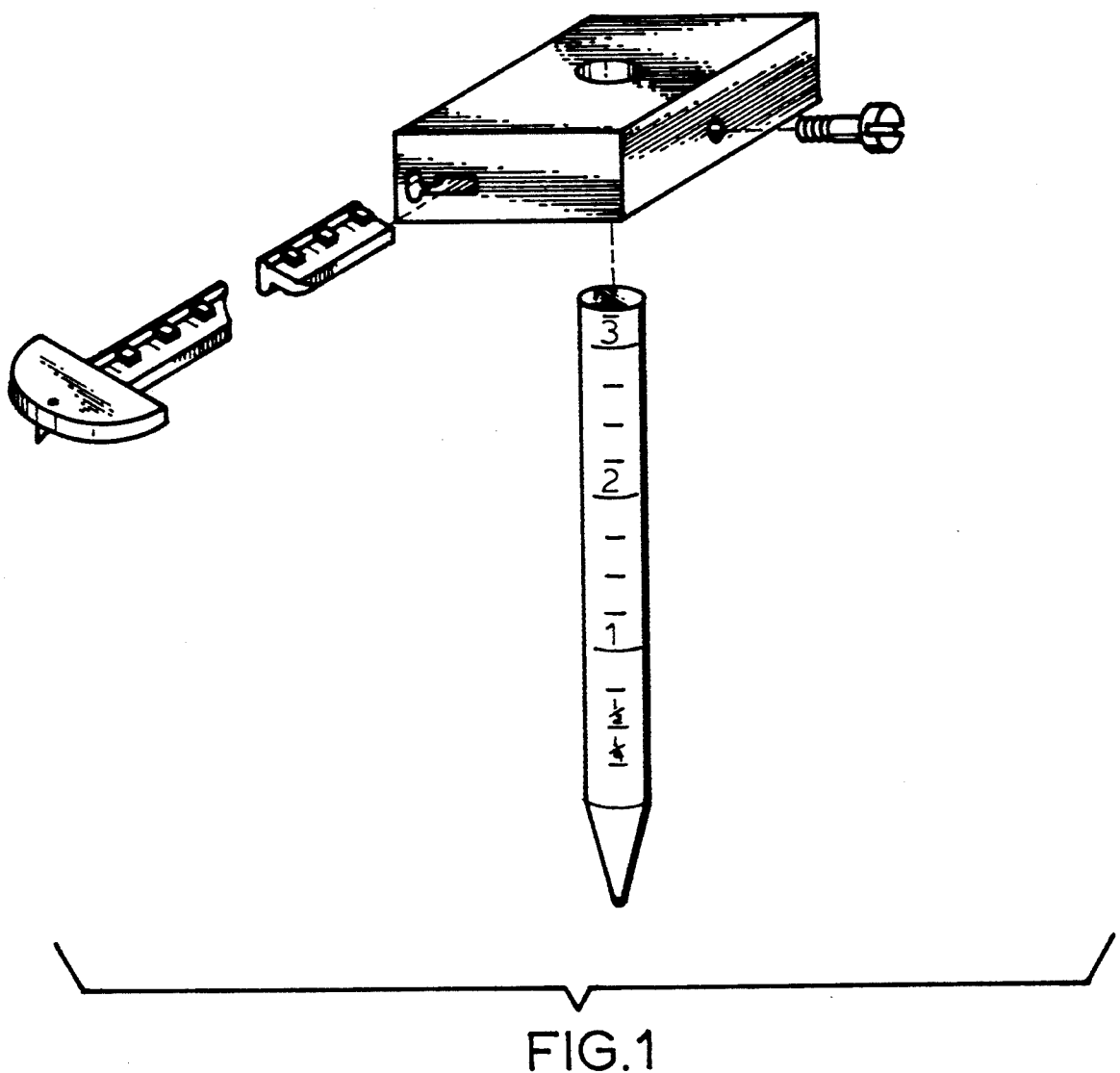
FIG. 1 is an exploded perspective view of the planting spacer embodying the present invention.

Shown in FIG. 1 is a dibble or planting spacer and planting depth defining device 10 embodying the present invention. Device 10 includes a cylindrical rod element 12 that is slidably received in a mounting block element 14 which also slidably supports a ruler element 16. In the preferred form of the spacer, the rod element 12 is located in a vertical plane while ruler element 16 is located in a horizontal plane. The rod element is used to define a hole in the ground into which a seed is planted, and the ruler element is used to define the spacing between such holes. Both of these elements are easily adjustable in their respective planes to accommodate a wide variety and range of planting depths for the planting holes (rod element and block element) and of the plant spacings (rod element and ruler element).

Figure 2:
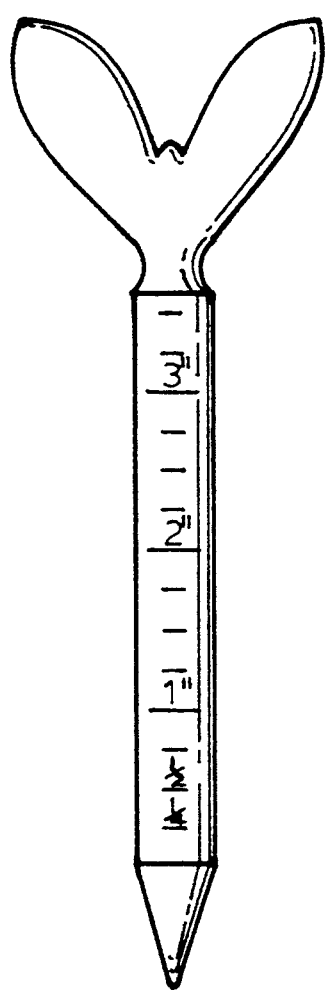
FIG. 2 is a front elevational view of a rod element of the planting spacer.

As is best shown in FIG. 2, rod element 12 includes central body 20 having a planting hole-defining point 22 and a handle end 24 with a longitudinal centerline 26 extending therebetween. The point end is forced into the soil to define a hole into which a seed is placed for planting, and a handle 28 or other such element is attached to the handle end 24. Handle 28 includes wings 30 or other such gripping elements so the rod can be forced into the soil. Handle 28 illustrates the best mode, but is merely illustrative of the many different types of handles that can be used, and is not intended to be limiting. In fact, FIG. 1 is drawn without any handle.

A plurality of planting hole depth-defining markings 32 are located on body 20 and are spaced apart from each other along longitudinal centerline 26 whereby a user will be able to set a depth for planting and will be able to repeat that depth for all holes in a particular planting. The markings can include indicia, such as length measurements, or indications for special plants, or the like.

Figure 3A:
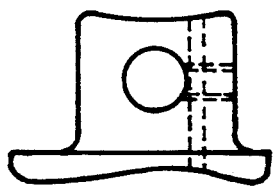
FIG. 3A is a top plan view of a mounting block element of the planting spacer.
Figure 3B:
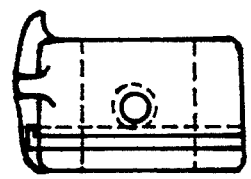
FIG. 3B is a side elevational view of a mounting block element of the planting spacer, the side opposite being a mirror image of the side shown in FIG. 3B.
Figure 3C:
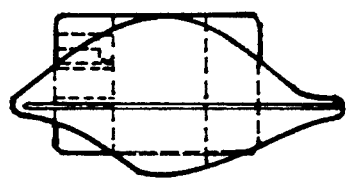
FIG. 3C is a front elevational view of a mounting block element of the planting spacer.

One form of the mounting block is shown in FIG. 1, and a second form of mounting block element 14 is shown in FIGS. 3A-3C as including a main body 40 having a top surface 42, a bottom surface 44 and end walls 46 and side walls 48 connecting the top and bottom surfaces. Two forms of the mounting block are disclosed for the purpose of completeness. Mounting block element 14 includes a central bore 50 that is sized to slidably receive rod element 12 with a friction fit between the rod and the block whereby block element 14 can be slidably moved on rod element 12 in directions 13' and 13" as indicated by double-headed arrow 13 in FIG. 1, but will remain at a selected location on that rod element. Using markings 32 in conjunction with block element 14 permits a user to set the desired depth of a planting hole. Block element 12 is moved on rod element 12 until block top surface 42 is adjacent to a selected marking. The markings are set to read the depth of hole when bottom surface 44 engages top surface of the soil. Thus, setting block element top surface 42 adjacent to a certain marking sets the depth of the hole defined when the rod is forced into the soil until bottom surface 44 engages the soil top surface.

Mounting block element 14 can be secured to rod element 12 by attaching means 60 that includes a bore 62 defined in block element 14 through side wall 48 towards central bore 50. Bore 62 includes a thread 64 defined on the block adjacent to the bore. Attaching means 60 further includes a set screw 66 having a thread 68 that co-operates with thread 64 to attach the set screw to block element 14. Set screw 66 is threadably received in bore 62 until end 70 of the set screw engages the outer surface of rod element body 20 whereby block element 14 is securely attached to rod element 12 at a selected position on that rod element.

Referring to FIG. 1, it is seen that block element 14 further includes a slot 74 that extends completely through the block from one end 46 to the other end. The slot 74 includes a first portion 76 and a second portion 78. Second portion 78 includes two arcuate shoulders 80 connected together by a linear central section 82. First section 76 includes planar top and bottom walls 86 and 87 connected together by a planar end wall 88. A flexible calibrating projection element 90 is fixed to the mounting block top wall 86 to depend into the slot 74 but to be spaced apart from the slot bottom wall 87. The projection element 90 can be a thin metal sheet or an elastomeric sheet, and forms a flap for a purpose that will be understood from the following discussion. The element 90 can be flexed in directions 92' and 92" to move into and out of the slot. The slot can also include a single section, section 76 that extends to the side wall of the block if suitable. Such a form of the block eliminates section 78.

Figure 4:
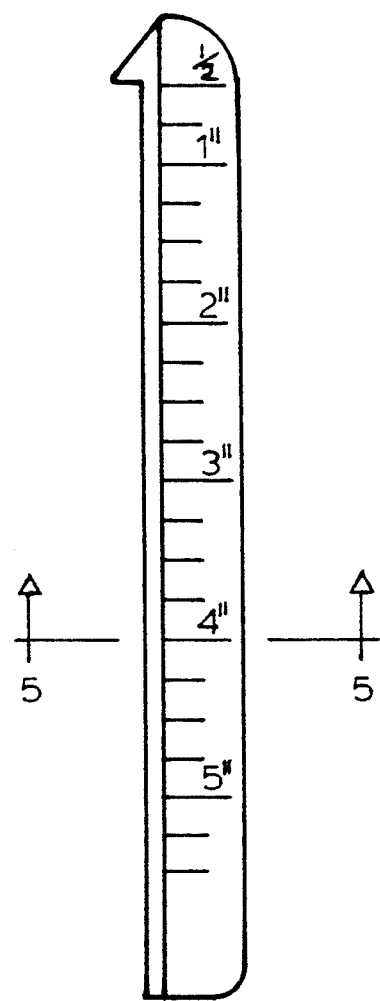
FIG. 4 is a front elevational view of a ruler element of the planting spacer.
Figure 5:
FIG. 5 is a sectional view taken along line 5—5 of FIG. 4.
Figure 6:
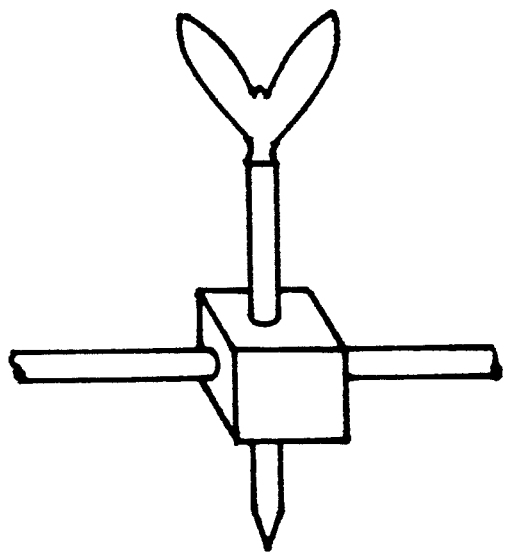
FIG. 6 is a perspective view of the planting spacer of the present invention.
Figure 7:
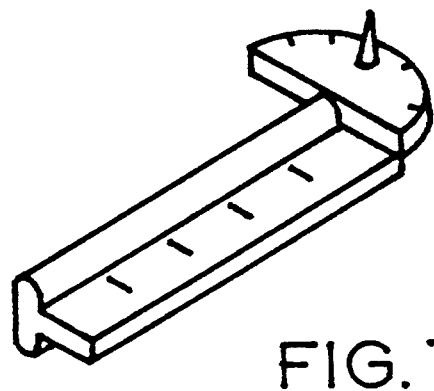
FIG. 7 is a top, end and side perspective view of another form of the ruler element which includes a spike element on one end thereof.

Ruler element 16 is slidably received in slot 74 and moves in directions 92' and 92" as indicated by double-headed arrow 92 in FIG. 1. Ruler element 16 is shown in FIGS. 1 and 7 and includes a main body 94 having a first section 96 and a second section 98. First section 96 is shaped and sized to slidably move within slot first section 76; whereas, second section 98 is shaped and sized to slidably move within slot second section 78. Ruler element first section 96 has a thickness that is slightly less than the spacing between walls 87 and 88 whereas the ruler element second section 98 snugly fits into slot second section 78 for a purpose that will be understood from the ensuing discussion. A plurality of raised marking projections 100 are located on the ruler element in position to engage the calibrating projection element 90 as the ruler element slides in the slot 74. Raised projections 100 are spaced apart longitudinally of the ruler element and are each located at a predetermined location on the ruler element. Marking indicia can be located adjacent to each projection 100 if suitable. Engagement between a raised projection 100 and the flap-like projection element 90 acts like a click-stop to set the ruler element in the block in a chosen position. A second form of the ruler element is shown in FIGS. 4 and 5 as ruler element 16', and includes a single shoulder 98'. Slot 74 is modified accordingly to include a modified section 78' to accommodate such single shoulder if ruler element 16' is used.

Figure 8:
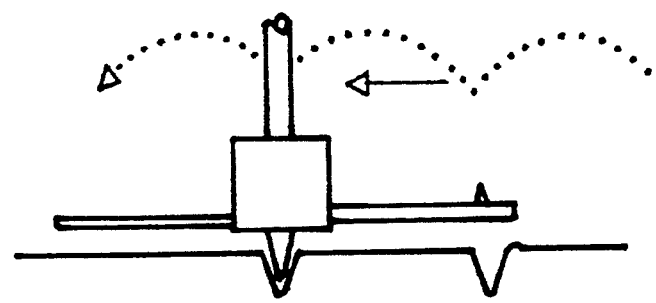
FIG. 8 is a schematic illustrating the use of one form of the planting spacer.
Figure 9:
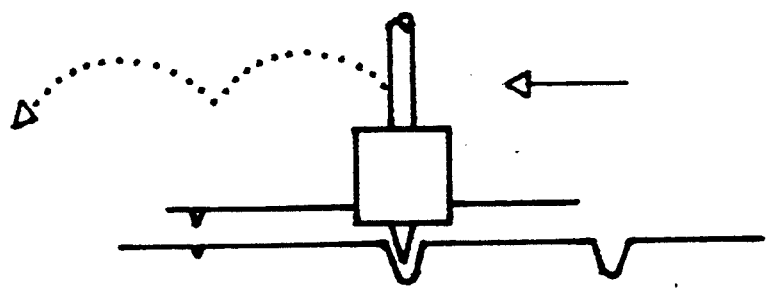
FIG. 9 is a schematic illustrating the use of another form of the planting spacer.

A spike element 102 is mounted on one end of the ruler element and includes a base 104 with a spike 106 attached thereto. As will be discussed below, spike 106 is used to mark the soil for placing the point 22 to define a planting hole. If the spike is used, it is oriented downwardly as shown in FIGS. 1 and 9; whereas, if the spike is not used, it is oriented upwardly as shown in FIG. 8. Ruler element 16' also includes spike element 102.

In use, block 14 is slipped onto rod 12 until the upper surface of the block is adjacent to a selected marking on the rod. Set screw 66 is threaded into the bore 62 until end 70 firmly engages the rod to securely attach the block element to the rod element at the selected height. Ruler element 16 is slid into and through the slot 74 with projections 100 engaging the flap-like element 90 until the desired marking is adjacent to the block end 46. The markings on the ruler element set the spacing between planting holes. Therefore, by selecting a particular projection 100 and locating it adjacent to the projection 90, the spacing between spike 106 and rod 12 is set thereby setting the spacing between planting holes.

Device 10 is used as shown in FIGS. 8 and 9, with the spike 106 being used to define a dimple 108 in the soil for the next hole adjacent to hole 110 in FIG. 9. The direction of movement of the device is indicated in FIGS. 8 and 9 by dashed lines 114. If the spike is not to be used, it is turned upwardly as indicated in FIG. 8. Planting holes, such as holes P in FIGS. 8 and 9, are formed by simply pressing down on the rod element and forcing the point 22 into the ground S until bottom surface 44 of the block element engages top surface TS of the ground S. The ruler is then positioned to extend along the desired row, and pressed toward the ground to form dimple 108 in the ground or simply to mark the ground for the next hole. The rod is moved into the dimple and pressed as above-discussed to form the next hole. Guide lines, such as strings, or the like, can be used to form straight rows if desired.

It is understood that while certain forms of the present invention have been illustrated and described herein, it is not to be limited to the specific forms or arrangements of parts described and shown.

We claim:

1. A planting spacer and planting depth defining device comprising:

A) a rod element having a planting hole-defining point on one end thereof, a longitudinal axis extending through said point, and a plurality of planting hole depth-defining markings thereon;

B) a mounting block mounted on said rod element and slidable longitudinally of said rod element, said mounting block having a bore defined therethrough, a slot defined therethrough, said slot including a first portion and a second portion, with said second portion being oriented at an angle to said first portion, and block attaching means for attaching said block to said rod element;

C) a spacing ruler mounted on said block in said slot to slide in said slot, said spacing ruler having a first section which is slidably received in said first portion and a second section which is slidably received in said second portion, said second section being oriented at an angle to said first section and having a top planar surface, said ruler being elongated and having a plurality of rigid marking projections on said top planar surface, said rigid markings being raised above said top planar surface; and D) ruler attaching means for attaching said ruler to said block so that said ruler can slide in said slot longitudinally of said ruler, said ruler attaching means including a flexible calibrating projection element mounted at one end thereof on said block adjacent to said slot and having a free end thereof located in said second portion, said free end engaging said rigid marking projections as said ruler is moved in said slot.

2. The device defined in claim 1 wherein said block bore is sized to slidably receive said rod element with said rod element frictionally engaging said block adjacent to said bore.

3. The device defined in claim 2 wherein said bore is perpendicular to said slot.

4. The device defined in claim 2 wherein said block attaching means includes a set screw receiving bore defined in said block, and a set screw threadably received in said set screw receiving bore.

5. The device defined in claim 1 further including a spike mounting element on said ruler.

6. The device defined in claim 1 further including a handle on said rod element.

* * * * *